(12) United States Patent
Otsuka

(10) Patent No.: US 12,113,968 B2
(45) Date of Patent: Oct. 8, 2024

(54) TRANSMISSION DEVICE, TRANSMISSION METHOD, AND PROGRAM

(71) Applicant: SONY INTERACTIVE ENTERTAINMENT INC., Tokyo (JP)

(72) Inventor: Katsushi Otsuka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 57 days.

(21) Appl. No.: 17/914,075

(22) PCT Filed: Mar. 24, 2021

(86) PCT No.: PCT/JP2021/012312
§ 371 (c)(1),
(2) Date: Sep. 23, 2022

(87) PCT Pub. No.: WO2021/200492
PCT Pub. Date: Oct. 7, 2021

(65) Prior Publication Data
US 2023/0121046 A1    Apr. 20, 2023

(30) Foreign Application Priority Data
Mar. 31, 2020  (JP) ................................ 2020-063853

(51) Int. Cl.
*H04N 7/12*    (2006.01)
*G06T 17/00*   (2006.01)
(Continued)

(52) U.S. Cl.
CPC ............ *H04N 19/115* (2014.11); *G06T 17/00* (2013.01); *H04N 19/132* (2014.11); *H04N 19/142* (2014.11); *H04N 19/17* (2014.11)

(58) Field of Classification Search
CPC .. H04N 19/115; H04N 19/132; H04N 19/142; H04N 19/17; H04N 19/146; H04N 19/172; H04N 19/174; G06T 17/00
See application file for complete search history.

(56) References Cited

U.S. PATENT DOCUMENTS 9,183,446 B2 * 11/2015 Okawa ................. G06V 40/167
9,704,270 B1 *  7/2017 Main ...................... G06T 15/60
(Continued)

FOREIGN PATENT DOCUMENTS

JP    H08-070458 A    3/1996
JP    2001-251629 A   9/2001
(Continued)

OTHER PUBLICATIONS

International Search Report and Written Opinion mailed Jun. 8, 2021, from PCT/JP2021/012312, 13 sheets.

*Primary Examiner* — Gims S Philippe
(74) *Attorney, Agent, or Firm* — XSENSUS LLP

(57) ABSTRACT

Provided are a transmission device, a transmission method, and a program capable of performing rate control suitable for an image quality priority image. A basic parameter value decision section (28a) decides, for a frame image that is not an image quality priority image, values of parameters used for encoding an encoding unit that is a part or whole of the frame image, by applying the difference between a control amount and a target value to a predetermined control rule. An image quality priority parameter value decision section (28b) decides, for the frame image that is the image quality priority image, values by which the data size of the generated image data becomes larger than those decided by applying the difference between the control amount and the target value to the predetermined control rule as the values of the parameters used for the encoding unit of the frame image.

25 Claims, 5 Drawing Sheets

(51) Int. Cl.
*H04N 19/115* (2014.01)
*H04N 19/132* (2014.01)
*H04N 19/142* (2014.01)
*H04N 19/17* (2014.01)

(56) References Cited

U.S. PATENT DOCUMENTS

| | | | | |
|---|---|---|---|---|
| 2014/0118478 A1* | 5/2014 | Nakazawa | ............ | H04N 19/164 |
| | | | | 348/14.13 |
| 2014/0294096 A1* | 10/2014 | Togo | .................. | H04N 21/8456 |
| | | | | 375/240.26 |
| 2014/0314080 A1* | 10/2014 | Park | ........................ | H04L 47/23 |
| | | | | 370/391 |
| 2015/0281709 A1* | 10/2015 | Bracha | ................... | H04N 19/65 |
| | | | | 375/240.26 |
| 2016/0100181 A1* | 4/2016 | Toda | .................... | H04N 19/107 |
| | | | | 375/240.25 |
| 2018/0316842 A1* | 11/2018 | Taoki | ...................... | H04N 23/66 |
| 2020/0322691 A1* | 10/2020 | Hui | ................... | H04N 21/6373 |

FOREIGN PATENT DOCUMENTS

| | | | |
|---|---|---|---|
| JP | 2001-309383 | A | 11/2001 |
| JP | 2004-15351 | A | 1/2004 |
| JP | 2007-124580 | A | 5/2007 |
| JP | 2015-197805 | A | 11/2015 |
| JP | 2018-532444 | A | 11/2018 |
| WO | 2019/033877 | A1 | 2/2019 |

\* cited by examiner

TRANSMISSION DEVICE, TRANSMISSION METHOD, AND PROGRAM

TECHNICAL FIELD

The present invention relates to a transmission device, a transmission method, and a program.

BACKGROUND ART

In the technology of a cloud gaming service that has attracted attention in recent years, a frame image representing a play status of a game is generated in a cloud server. Then, image data obtained by encoding the frame image is transmitted from the cloud server to a terminal, and the frame image obtained by decoding the image data in the terminal is displayed. By repeatedly executing the series of processing, a moving image representing the play status of the game is displayed on the terminal.

In addition, there is a rate control technique for adjusting the values of parameters such as a QP (Quantization Parameter), a bit depth, and an image resolution by feedback control using the data size of the image data, the length of latency, and the like as control amounts. In the rate control, an overshoot in which the control amount becomes larger than the target value occurs, or an undershoot in which the control amount becomes smaller than the target value occurs, but control is performed so that the difference between the control amount and the target value does not become too large as a whole.

SUMMARY

Technical Problems

Among the generated frame images, there are, for example, images (hereinafter, referred to as image quality priority images) whose image quality is prioritized even if the occurrence of a large overshoot is temporarily permitted, such as a frame image immediately after the occurrence of a scene change.

However, such an image quality priority image could not be exceptionally handled in the conventional rate control. In addition, in the conventional rate control, there has been no means for determining whether the image quality should be prioritized or whether the suppression of a data size and the length of latency should be prioritized in the frame image immediately after the occurrence of a scene change in which the amount of image changes is large.

It should be noted that this is generally true not only in a situation where cloud gaming services are provided, but also in a situation where a moving image is transmitted from a transmission device corresponding to the above-described cloud server.

The present invention has been made in view of the above circumstances, and one of the objects thereof is to provide a transmission device, a transmission method, and a program capable of performing rate control suitable for an image quality priority image.

Solution to Problems

In order to solve the above problems, the present invention provides a transmission device including an acquisition section that sequentially acquires frame images drawn in a frame buffer, a determination section that determines whether or not the frame image is an image quality priority image, a basic parameter value decision section that decides, for the frame image that is not the image quality priority image, values of parameters used for encoding an encoding unit that is a part or whole of the frame image, by applying a difference between a control amount and a target value to a predetermined control rule, an image quality priority parameter value decision section that decides, for the frame image that is the image quality priority image, values of parameters used for the encoding unit of the frame image, an encoding processing section that generates image data by executing the encoding of the encoding unit on the basis of the values of the parameters decided by the basic parameter value decision section or the image quality priority parameter value decision section, and a transmission section that transmits the image data, and the image quality priority parameter value decision section decides, as the values of the parameters used for the encoding unit of the frame image, values by which a data size of the generated image data becomes larger than those decided by applying the difference between the control amount and the target value to the predetermined control rule.

According to an aspect of the present invention, the encoding processing section skips encoding of the frame image next to the image quality priority image.

Moreover, the encoding processing section decides the number of frame skips on the basis of the data size of the image data generated by encoding the image quality priority image, and the encoding processing section skips the encoding of the frame image following the image quality priority image by the number of frame skips.

Moreover, for the frame image next to the image quality priority image, the basic parameter value decision section decides the values of the parameters used for the encoding unit of the frame image by applying the difference between the control amount and the target value to the predetermined control rule.

Moreover, for the frame image next to the image quality priority image, the basic parameter value decision section decides, as the values of the parameters, values by which the data size of the generated image data becomes smaller than those decided by applying the difference between the control amount and the target value to the predetermined control rule.

In addition, according to an aspect of the present invention, the acquisition section acquires the frame image associated with image quality priority necessity data capable of specifying whether or not the frame image is the image quality priority image, and the determination section determines whether or not the frame image is the image quality priority image on the basis of the image quality priority necessity data associated with the frame image.

In this aspect, an image quality priority necessity data generation section that generates the image quality priority necessity data and associates the image quality priority necessity data with the frame image may be further provided.

Further, the image quality priority necessity data generation section may associate a frame image immediately after a camera cut is performed after description of a continuous scene or a continuous game play is terminated with the image quality priority necessity data capable of specifying that the frame image is the image quality priority image.

Moreover, the image quality priority necessity data generation section may associate a frame image immediately after a stage in a game has changed with the image quality priority necessity data capable of specifying that the frame image is the image quality priority image.

Moreover, the image quality priority necessity data generation section may associate a frame image immediately after assets used for drawing the frame image are switched after the drawing of a continuous scene is terminated with the image quality priority necessity data capable of specifying that the frame image is the image quality priority image.

Moreover, the image quality priority necessity data generation section may associate a frame image immediately after a new asset used for drawing the frame image is loaded into a memory with the image quality priority necessity data capable of specifying that the frame image is the image quality priority image.

In addition, according to an aspect of the present invention, the determination section determines that the frame image in which a scene change from a last frame has occurred is the image quality priority image.

Moreover, the acquisition section acquires the frame image representing a state of viewing a virtual space from a virtual object arranged in the virtual space, and the determination section determines that the frame image immediately after the virtual object has changed from a last frame is the image quality priority image.

Moreover, an image generating section that generates the frame image on the basis of drawing intermediate data representing a state of viewing the virtual space from the virtual object arranged in the virtual space is further provided, and the determination section determines that the frame image generated by the image generation section on the basis of the drawing intermediate data immediately after the virtual object has changed from a last frame is the image quality priority image.

Moreover, the determination section determines that the frame image immediately after assets used for drawing the frame image are switched is the image quality priority image.

Moreover, the determination section determines whether or not the frame image is the image quality priority image on the basis of a result of comparison between the frame image and a frame image of a frame immediately before the frame image.

In addition, according to an aspect of the present invention, the encoding processing section encodes the frame image as the image quality priority image into an I frame.

Moreover, the image quality priority parameter value decision section decides, as the values of the parameters used for the encoding unit of the frame image, values by which a compression ratio of the generated image data becomes smaller than those decided by applying the difference between the control amount and the target value to the predetermined control rule.

Moreover, the encoding processing section executes encoding using a GDR (gradual decoder refresh) technique for the frame image that is not the image quality priority image.

In addition, according to an aspect of the present invention, the control amount is the data size of the image data or a length of time from a start timing of the encoding of the frame image to a transmission end timing of the image data generated on the basis of the frame image.

In addition, according to an aspect of the present invention, the image quality priority parameter value decision section decides the values of the parameters that correspond to a case where a value smaller than the difference between the control amount and the target value is applied to the predetermined control rule and are used for the encoding unit of the frame image.

In addition, according to an aspect of the present invention, the basic parameter value decision section and the image quality priority parameter value decision section decide the values of the parameters used for the encoding unit by performing PID (Proportional Integral Derivative) control, and the image quality priority parameter value decision section decides the values of the parameters used for the encoding unit of the frame image by suppressing a gain of at least one of proportional control and differential control in the PID control more than that decided by the basic parameter value decision section.

In addition, according to an aspect of the present invention, the image quality priority parameter value decision section decides the values of the parameters on the basis of the difference between the control amount and the target value at a time interval longer than that of the basic parameter value decision section.

In addition, according to an aspect of the present invention, the basic parameter value decision section or the image quality priority parameter value decision section decides the values of the parameters further on the basis of at least one of the number of times the image data has been missing per unit time in the past and the number of times the I frame has been generated per unit time in the past.

In addition, the present invention provides a transmission method including an acquisition step of sequentially acquiring frame images drawn in a frame buffer, a determination step of determining whether or not the frame image is an image quality priority image, a basic parameter value decision step of deciding, for the frame image that is not the image quality priority image, values of parameters used for encoding an encoding unit that is a part or whole of the frame image, by applying a difference between a control amount and a target value to a predetermined control rule, an image quality priority parameter value decision step of deciding, for the frame image that is the image quality priority image, values of parameters used for the encoding unit of the frame image, an encoding processing step of generating image data by executing the encoding of the encoding unit on the basis of the values of the parameters decided in the basic parameter value decision step or the image quality priority parameter value decision step, and a transmission step of transmitting the image data, and in the image quality priority parameter value decision step, as the values of the parameters used for the encoding unit of the frame image, values by which a data size of the generated image data becomes larger than those decided by applying the difference between the control amount and the target value to the predetermined control rule are decided.

In addition, the present invention provides a program causing a computer to execute an acquisition procedure of sequentially acquiring frame images drawn in a frame buffer, a determination procedure of determining whether or not the frame image is an image quality priority image, a basic parameter value decision procedure of deciding, for the frame image that is not the image quality priority image, values of parameters used for encoding an encoding unit that is a part or whole of the frame image, by applying a difference between a control amount and a target value to a predetermined control rule, an image quality priority parameter value decision procedure of deciding, for the frame image that is the image quality priority image, values of parameters used for the encoding unit of the frame image, an encoding processing procedure of generating image data by executing the encoding of the encoding unit on the basis of the values of the parameters decided in the basic parameter value decision procedure or the image quality priority parameter value decision procedure, and a transmission procedure of transmitting the image data, and in the image quality priority parameter value decision procedure, as the values of the parameters used for the encoding unit of the frame image, values by which a data size of the generated image data becomes larger than those decided by applying the difference between the control amount and the target value to the predetermined control rule are decided.

DESCRIPTION OF EMBODIMENT

Figure 1:
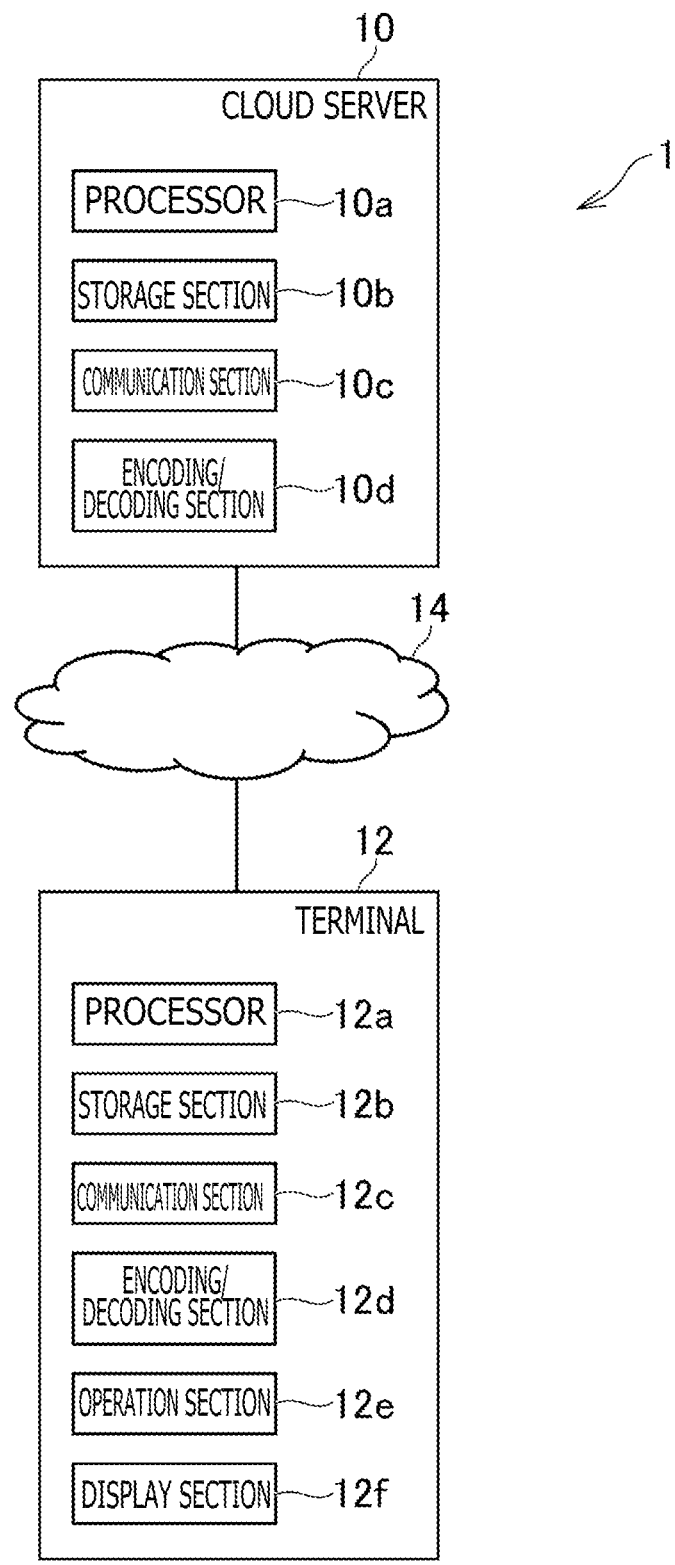
FIG. 1 is a diagram for illustrating an example of the overall configuration of a cloud gaming system according to an embodiment of the present invention.

FIG. 1 is a diagram for illustrating an example of the overall configuration of a cloud gaming system 1 according to an embodiment of the present invention. As illustrated in FIG. 1, the cloud gaming system 1 according to the embodiment includes a cloud server 10 and a terminal 12, each of which is mainly configured using a computer. The cloud server 10 and the terminal 12 are connected to a computer network 14 such as the Internet, and the cloud server 10 and the terminal 12 can communicate each other.

The cloud server 10 according to the embodiment is, for example, a server computer that executes a program of a game related to a cloud gaming service. The cloud server 10 distributes a moving image representing a play status of the game to the terminal 12 used by a user who is playing the game.

As illustrated in FIG. 1, the cloud server 10 includes, for example, a processor 10a, a storage section 10b, a communication section 10c, and an encoding/decoding section 10d.

The processor 10a is, for example, a program control device such as a CPU (Central Processing Unit) and executes various information processing according to a program stored in the storage section 10b. The processor 10a according to the embodiment also includes a GPU (Graphics Processing Unit) for drawing an image in a frame buffer on the basis of graphics commands and data supplied from the CPU.

The storage section 10b is, for example, a storage element such as a ROM (Read Only Memory) or a RAM (Random Access Memory), or an SSD (solid State Drive). The storage section 10b stores a program and the like executed by the processor 10a. In addition, in the storage section 10b according to the embodiment, an area for the frame buffer in which an image is drawn by the GPU included in the processor 10a is secured.

The communication section 10c is a communication interface for exchanging data with a computer such as the terminal 12 via, for example, the computer network 14.

The encoding/decoding section 10d includes, for example, an encoder and a decoder. The encoder encodes an input image to generate image data representing the image. In addition, the decoder decodes input image data and outputs an image represented by the image data.

The terminal 12 according to the embodiment is, for example, a computer such as a game console, a personal computer, a tablet terminal, or a smartphone used by a user who uses a cloud gaming service.

As illustrated in FIG. 1, the terminal 12 includes, for example, a processor 12a, a storage section 12b, a communication section 12c, an encoding/decoding section 12d, an operation section 12e, and a display section 12f.

The processor 12a is, for example, a program control device such as a CPU and executes various information processing according to a program stored in the storage section 12b. The processor 12a according to the embodiment also includes a GPU for drawing an image in a frame buffer on the basis of graphics commands and data supplied from the CPU.

The storage section 12b is, for example, a storage element such as a ROM or a RAM, or an SSD. The storage section 12b stores a program and the like executed by the processor 12a. In addition, in the storage section 12b according to the embodiment, an area for the frame buffer in which an image is drawn by the GPU included in the processor 12a is secured.

The communication section 12c is a communication interface for exchanging data with a computer such as the cloud server 10 via, for example, the computer network 14.

The encoding/decoding section 12d includes, for example, an encoder and a decoder. The encoder encodes an input image to generate image data representing the image. In addition, the decoder decodes input image data and outputs an image represented by the image data.

The operation section 12e is, for example, an operation member for inputting an operation to the processor 12a.

The display section 12f is, for example, a display device such as a liquid crystal display or an organic EL (electroluminescent) display.

It should be noted that the terminal 12 need not include the GPU and the frame buffer.

When an operation related to a game is performed for the terminal 12 according to the embodiment via the operation section 12e, an operation signal representing the operation is transmitted from the terminal 12 to the cloud server 10. Then, game processing according to the operation signal is executed in the cloud server 10. Then, a play image as a frame image representing a play status of the game affected by the operation signal is generated, and the play image is drawn in the frame buffer of the cloud server 10. In the embodiment, the game processing and the generation of the play image are repeatedly executed.

Then, the cloud server 10 sequentially acquires the play images drawn in the frame buffer and generates image data representing the play images. Then, the cloud server 10 transmits the generated image data to the terminal 12. Then, the terminal 12 displays a play image generated by decoding the image data received from the cloud server 10 on the display section 12f. In this manner, a play moving image configured using a series of play images is displayed on the display section 12f in the embodiment.

In the cloud server 10 according to the embodiment, rate control for adjusting the values of parameters such as a QP, a bit depth, and an image resolution is performed by feedback control using the data size of the image data, the length of latency, and the like as control amounts.

Figure 2:
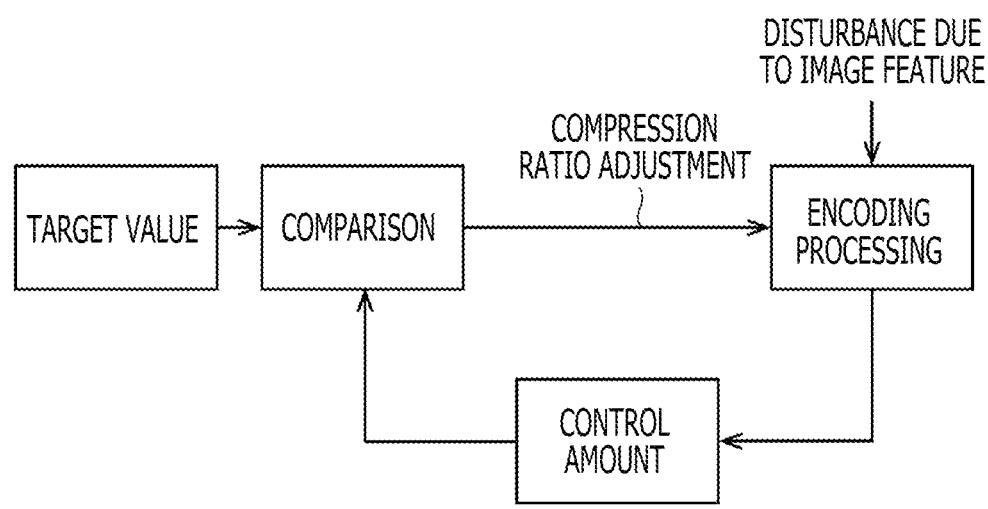
FIG. 2 is a conceptual diagram for illustrating an example of rate control.

FIG. 2 is a conceptual diagram for illustrating an example of the rate control in the embodiment. As illustrated in FIG. 2, for example, the control amount in the image data generated by executing the encoding processing is compared with a target value in the embodiment. Then, a compression ratio is decided on the basis of the result of comparison between the control amount and the target value and the feature of the image. Here, the compression ratio is adjusted on the basis of the result of comparison between the control amount and the target value.

Then, the values of the parameters such as the QP, the bit depth, and the image resolution are decided on the basis of the decided compression ratio. It should be noted that the values of the parameters may include a value indicating the frame type (for example, whether the frame is an I frame or a P frame) of the generated image data.

Then, the encoding processing of the image based on the values of the decided parameters is executed. The image data generated by executing the encoding processing is transmitted to the terminal 12. In the rate control according to the embodiment, the feedback control by the loop illustrated in FIG. 2 is repeatedly executed.

Here, for example, an example of the control amount is a cumulative data size that is the total of the data sizes of the image data transmitted so far. In addition, the above-described loop may be executed for each play image (frame image) or for each slice obtained by dividing one play image into a plurality of portions. In the following description, it is assumed that the data size of the play image or the slice that is a unit in which the encoding processing is executed is constant. It should be noted that the data size of the play image or the slice that is a unit in which the encoding processing is executed need not be constant.

Figure 3:
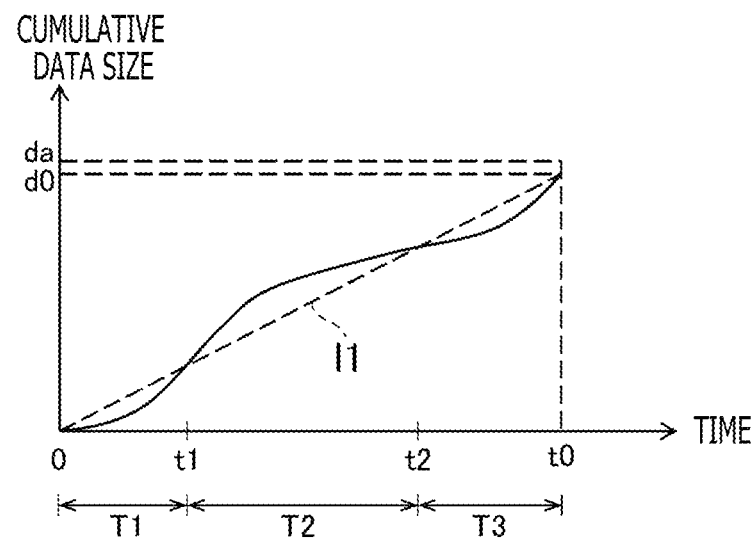
FIG. 3 is a diagram for schematically illustrating an example of a change in a cumulative data size in the rate control.

FIG. 3 is a diagram for illustrating an example of a change in the cumulative data size by the rate control illustrated in FIG. 2. In FIG. 3, for example, the upper limit (the upper limit of the data size that can be transferred in time t0) of the bandwidth of the communication path between the cloud server 10 and the terminal 12 is set as da. In addition, a value obtained by subtracting a predetermined buffer (margin value) from the value da that is the upper limit is set as d0. In this case, as illustrated by a broken line 11 in FIG. 3, the target value of the cumulative data size in a case where the time from the start of transmission is t is d0×t/t0.

In addition, in FIG. 3, the time change (the time change of the actual value of the cumulative data size) of the control amount is expressed by a solid line. Then, in the example of FIG. 3, in a period T1 from the start of transmission (time 0) to time t1 and in a period T3 from time t2 to t0, an undershoot in which the control amount is smaller than the target value occurs. In this situation, the decided compression ratio is lowered. Therefore, the control amount approaches the target value. On the other hand, in a period T2 from time t1 to time t2, an overshoot in which the control amount is larger than the target value occurs. In this situation, the decided compression ratio is increased. Therefore, even in this case, the control amount approaches the target value.

In addition, in the embodiment, each play image is associated with image quality priority necessity data capable of specifying whether or not the play image is an image quality priority image that prioritizes the image quality. Here, each play image may be associated with image quality priority necessity data according to whether or not a scene change from the frame immediately before the play image has occurred. For example, the play image in which the scene change from a last frame has occurred may be associated with the image quality priority necessity data whose value is 1, and the play image in which the scene change from the last frame has not occurred may be associated with the image quality priority necessity data whose value is 0. In the embodiment, for example, the play image associated with the image quality priority necessity data is handled as the image quality priority image.

Then, in the embodiment, the rate control according to the value of the image quality priority necessity data is performed as described below with reference to FIG. 4 to FIG. 6.

Figure 4:
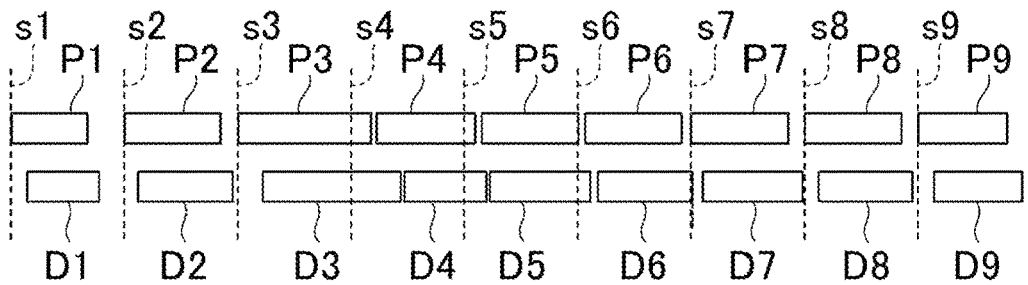
FIG. 4 is a diagram for schematically illustrating an example of the rate control.
Figure 5:
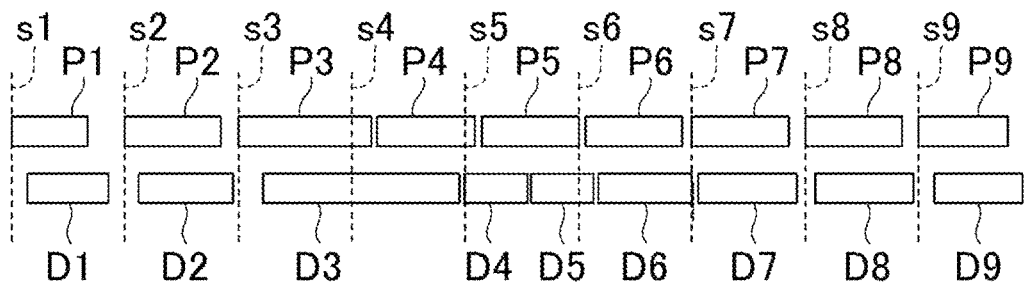
FIG. 5 is a diagram for schematically illustrating an example of the rate control.
Figure 6:
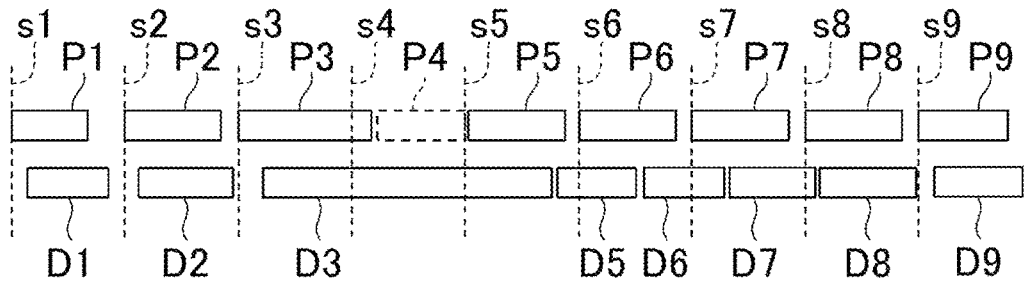
FIG. 6 is a diagram for schematically illustrating an example of the rate control.

FIG. 4 to FIG. 6 are diagrams each illustrating an example of an execution timing of the encoding processing and a transmission timing of the image data in the embodiment. In FIG. 4 to FIG. 6, periods during which the encoding processing is executed for the play images of the first frame to the ninth frame are expressed as P1 to P9, respectively. In addition, periods during which the image data generated by encoding the play images P1 to P9 is transmitted are expressed as D1 to D9, respectively. In addition, timings at which the encoding processing should be started for the first frame to the ninth frame are expressed as broken lines s1 to s9 extending in the vertical direction, respectively.

As illustrated in FIG. 4 to FIG. 6, the frame rate is constant in the embodiment. In addition, in the embodiment, the time from the start timing of the encoding processing of a play image to the end timing of the transmission of the image data generated on the basis of the play image is referred to as latency (delay).

In the examples of FIG. 4 to FIG. 6, the play image is encoded and the image data is transmitted by a slice transfer method in which one play image is divided into a plurality of portions and transmitted. Therefore, when the encoding of a slice that is a part of the play image is terminated before the encoding processing for all of one play image is terminated, the image data with the slice encoded is transmitted to the terminal 12.

A frame image having certain characteristics such as vigorous motion from the last frame, high definition, and many high frequency components is encoded into the I frame. In the examples of FIG. 4 to FIG. 6, the play image of the third frame is encoded into the I frame. Here, it is assumed that the play images of the third frame in the examples of FIG. 4 and FIG. 5 are associated with the image quality priority necessity data whose value is 0. In addition, it is assumed that the play image of the third frame in the example of FIG. 6 is associated with the image quality priority necessity data whose value is 1. It should be noted that, in any of the examples of FIG. 4 to FIG. 6, it is assumed that all the other play images are associated with the image quality priority necessity data whose value is 0.

The data size of the I frame is larger than that of the P frame. Therefore, as illustrated in FIG. 4, FIG. 5, and FIG. 6, the transmission time of the image data of the third frame is longer than those of the image data of the other frames. In addition, the encoding time of the play image of the third frame is also longer than those of the play images of the other frames.

The conditions of the rate control are different between FIG. 4 and FIG. 5, and the data size of the image data of the third frame is larger in FIG. 5 than in FIG. 4. Then, the transmission time of the image data of the third frame is longer in FIG. 5 than in FIG. 4.

Therefore, the difference between the above-described control amount and the target value at the end of the third frame is larger in FIG. 5 than in FIG. 4. Therefore, the compression ratio in the rate control for the subsequent frames is decided to be higher in FIG. 5 than in FIG. 4. Therefore, the data sizes of the image data of the fourth frame and the fifth frame are smaller in FIG. 5 than in FIG. 4. Then, in the seventh frame, the latency returns to the normal state in both FIG. 4 and FIG. 5.

In addition, in the embodiment, for example, even for the same play image, the encoding processing is executed at a lower compression ratio in a case where the value of the image quality priority necessity data associated with the play image is 1 than in a case where the value is 0. Therefore, the image quality of the decoded play image is higher in the case where the value of the image quality priority necessity data associated with the play image is 1 than in the case where the value is 0.

The data size of the image data of the third frame is larger in FIG. 6 than in FIG. 4 and FIG. 5. In this case, the overshoot in the third frame is permitted. Then, the image data of the fourth frame is missing in FIG. 6. Then, in FIG. 6, the latency returns to the normal state in the ninth frame.

Among the generated frame images, there are, for example, image quality priority images whose image quality is prioritized even if the occurrence of a large overshoot is temporarily permitted, such as a frame image immediately after the occurrence of a scene change.

However, such an image quality priority image could not be exceptionally handled in the conventional rate control.

In the embodiment, even for the same play image, the encoding processing is executed so that the data size of the image data becomes larger in a case where the play image is the image quality priority image than in a case where the play image is not the image quality priority image. Therefore, according to the embodiment, the rate control suitable for the image quality priority image can be performed.

Hereinafter, the functions of the cloud gaming system 1 according to the embodiment and the processing executed by the cloud server 10 will be further described.

Figure 7:
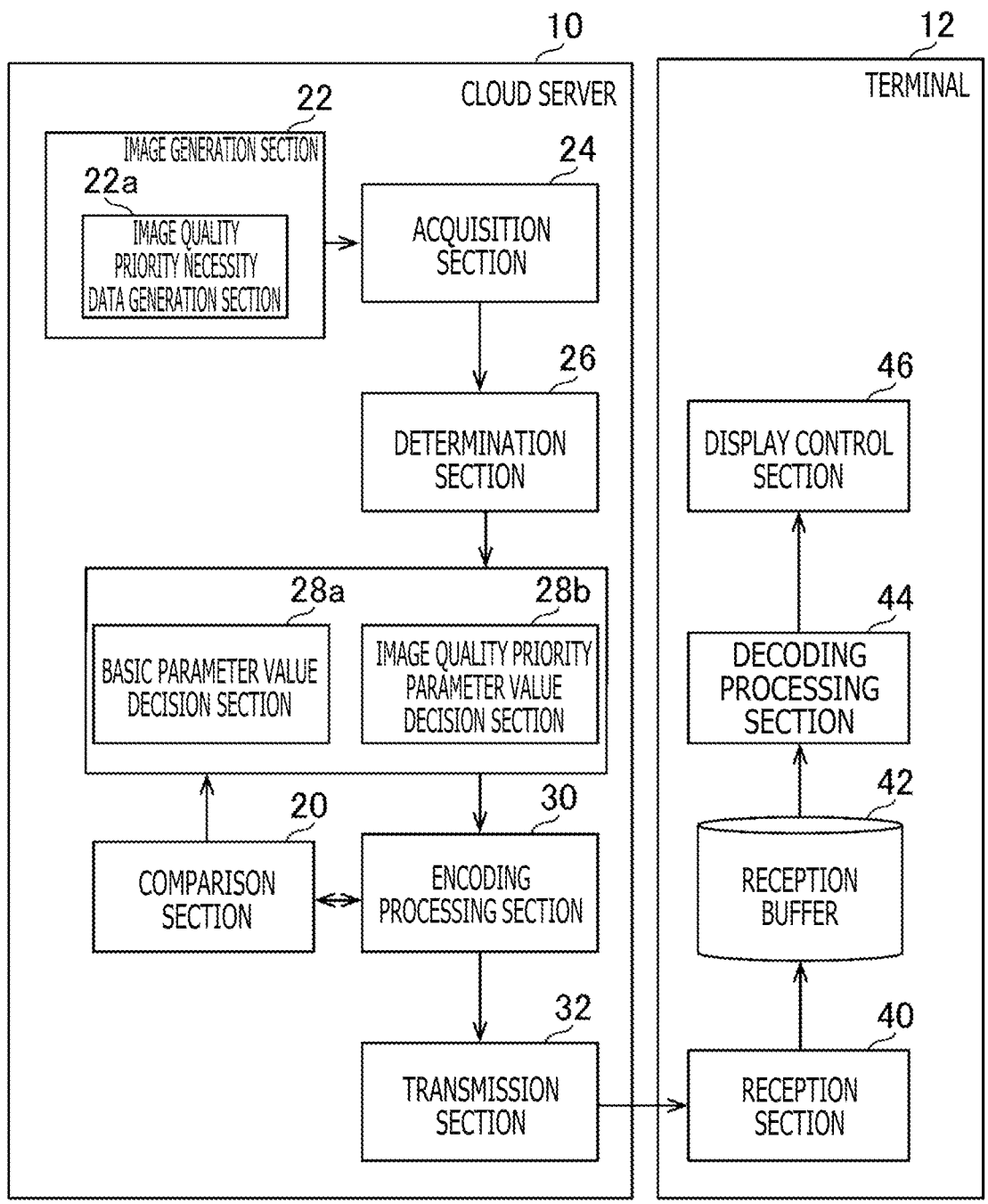
FIG. 7 is a functional block diagram for illustrating an example of functions implemented in the cloud gaming system according to the embodiment of the present invention.

FIG. 7 is a functional block diagram for illustrating an example of functions implemented in the cloud gaming system 1 according to the embodiment. It should be noted that, in the cloud gaming system 1 according to the embodiment, it is not necessary to implement all of the functions illustrated in FIG. 7, and functions (for example, execution of game processing on the basis of an operation signal and the like) other than those illustrated in FIG. 7 may be implemented.

As illustrated in FIG. 7, the cloud server 10 according to the embodiment functionally includes, for example, a comparison section 20, an image generation section 22, an acquisition section 24, a determination section 26, a basic parameter value decision section 28a, an image quality priority parameter value decision section 28b, an encoding processing section 30, and a transmission section 32. In addition, the image generation section 22 includes an image quality priority necessity data generation section 22a.

The comparison section 20 is implemented mainly with the processor 10a and the storage section 10b. The acquisition section 24 and the encoding processing section 30 are implemented mainly with the encoding/decoding section 10d. The image generation section 22, the determination section 26, the basic parameter value decision section 28a, and the image quality priority parameter value decision section 28b are implemented mainly with the processor 10a. The transmission section 32 is implemented mainly with the communication section 10c.

The above functions are implemented in such a manner that a program installed in the cloud server 10 that is a computer and including commands corresponding to the above functions is executed by the processor 10a. This program is supplied to the cloud server 10 via, for example, a computer-readable information storage medium such as an optical disk, a magnetic disk, a magnetic tape, a magneto-optical disk, or a flash memory, or via the Internet.

As illustrated in FIG. 7, the terminal 12 according to the embodiment functionally includes, for example, a reception section 40, a reception buffer 42, a decoding processing section 44, and a display control section 46.

The reception section 40 is implemented mainly with the communication section 12c. The reception buffer 42 is implemented mainly with the storage section 12b. The decoding processing section 44 is implemented mainly with the encoding/decoding section 12d. The display control section 46 is implemented mainly with the processor 12a and the display section 12f.

The above functions are implemented in such a manner that a program installed in the terminal 12 that is a computer and including commands corresponding to the above functions is executed by the processor 12a. This program is supplied to the terminal 12 via, for example, a computer-readable information storage medium such as an optical disk, a magnetic disk, a magnetic tape, a magneto-optical disk, or a flash memory, or via the Internet.

In the embodiment, for example, the comparison section 20 compares the above-described control amount with the target value. For example, the comparison section 20 stores control amount data indicating a control amount and target value data indicating a target value. Then, the comparison section 20 updates the control amount data every time image data is generated. Here, for example, in a case where the control amount is the cumulative data size as described above, the comparison section 20 increases the value of the control amount data by the magnitude of the data size of the image data.

In addition, in a case where the target value is a time variable such as the case where the control amount is the cumulative data size as described above, the comparison section 20 may appropriately update the target value data on the basis of the current time or the time from the start of transmission. For example, the target value data may be updated at predetermined time intervals.

The image generation section 22 generates, for example, a frame image in the embodiment. In addition, the image generation section 22 draws the generated frame image in the frame buffer. For example, the image generation section 22 generates the above-described play image.

In the embodiment, for example, the image quality priority necessity data generation section 22a generates image quality priority necessity data capable of specifying whether or not the frame image generated by the image generation section 22 is the image quality priority image, and associates the image quality priority necessity data with the frame image.

Here, the image quality priority necessity data generation section 22a may associate a frame image immediately after a camera cut is performed after description of a continuous scene or a continuous game play is terminated with the image quality priority necessity data capable of specifying that the frame image is the image quality priority image.

For example, a frame image immediately after a camera cut (camera shot) is performed after description (camera work) of a continuous scene is terminated may be associated with the image quality priority necessity data whose value is 1.

For example, when a player is driving a car from the viewpoint of the driver during the play of a race game, a frame image associated with the image quality priority necessity data whose value is 0 may be generated. Here, even if the vision of the driver suddenly changes, for example, by hitting the car against a curbstone and a change in the image feature amount between frames is large, the continuity (smoothness) of the moving image displayed as low latency is maintained although the image quality is lowered.

On the other hand, when the viewpoint is changed from a spectator seat, a frame image associated with the image quality priority necessity data whose value is 1 may be generated. Thus, the frame image immediately after the scene change is displayed in high quality. In addition, even if the image data generated on the basis of the frame image of the frame immediately thereafter is missing, the user is not so concerned.

In addition, for example, a frame image immediately after a camera cut (cutting) is performed after a certain continuous game play is terminated may be associated with the image quality priority necessity data whose value is 1.

In addition, the image quality priority necessity data generation section 22a may associate a frame image immediately after a stage in the game has changed with the image quality priority necessity data capable of specifying that the frame image is the image quality priority image.

For example, in a certain game, a frame image associated with the image quality priority necessity data whose value is 0 may be generated while a stage of walking in the forest continues. Thereafter, when the stage is changed to a stage of walking in the desert, a frame image associated with the image quality priority necessity data whose value is 1 may be generated.

In addition, the image quality priority necessity data generation section 22a may associate a frame image immediately after assets used for drawing the frame image are switched after the drawing of a continuous scene is terminated with the image quality priority necessity data capable of specifying that the frame image is the image quality priority image.

In addition, for example, a frame image immediately after assets (3D objects, texture data, and the like) used for drawing the frame image are switched after the drawing of a certain continuous scene is terminated may be associated with the image quality priority necessity data whose value is 1.

In addition, the image quality priority necessity data generation section 22a may associate a frame image immediately after a new asset used for drawing the frame image is loaded into a memory with the image quality priority necessity data capable of specifying that the frame image is the image quality priority image.

For example, in a certain game, a frame image associated with the image quality priority necessity data whose value is 0 may be generated while assets necessary for drawing a stage of walking in the forest are held in the memory. Thereafter, a frame image associated with the image quality priority necessity data whose value is 1 may be generated when processing of replacing the assets to draw a stage of walking in the desert is executed and a new asset is loaded into the memory. It should be noted that, in this case, the timing of the replacement of the assets may be specified by a system program, not by a program of a drawing system or a game system. Then, the system program may associate the frame image with the image quality priority necessity data whose value is 1.

In the embodiment, for example, the acquisition section 24 sequentially acquires the frame images (the play images in the above example) drawn in the frame buffer. In the embodiment, as described above, when the user is playing the game, a frame image associated with the image quality priority necessity data according to whether or not a scene change from the last frame has occurred is generated. Then, the frame image associated with the image quality priority necessity data is drawn in the frame buffer. Then, the acquisition section 24 acquires the frame image associated with the image quality priority necessity data. The frame image associated with the image quality priority necessity data is generated, for example, by a drawing program such as a game program included in the cloud server 10. It should be noted that the game engine may generate the frame image associated with the image quality priority necessity data. It should be noted that the image quality priority necessity data need not be data according to whether or not a scene change from the last frame has occurred, and the value of the image quality priority necessity data may be decided on the basis of predetermined logic.

In addition, the acquisition section 24 may acquire a frame image representing a state of viewing a virtual space from a virtual object arranged in the virtual space.

In the embodiment, for example, the determination section 26 determines whether or not the frame image acquired by the acquisition section 24 is the image quality priority image. For example, on the basis of the image quality priority necessity data associated with the frame image, the determination section 26 may determine whether or not the frame image is the image quality priority image. For example, in a case where the value of the image quality priority necessity data associated with the frame image is 1, the determination section 26 may determine that the frame image is the image quality priority image. On the other hand, for example, in a case where the value of the image quality priority necessity data associated with the frame image is 0, the determination section 26 may determine that the frame image is not the image quality priority image.

In addition, the determination section 26 may determine whether or not a scene change from the last frame has occurred. Then, the determination section 26 may determine that the frame image in which the scene change from the last frame has occurred is the image quality priority image and that the frame image in which the scene change has not occurred is not the image quality priority image.

Here, as described above, the acquisition section 24 may acquire a frame image representing a state of viewing a virtual space from a virtual object arranged in the virtual space. In this case, the determination section 26 may determine the frame image immediately after the virtual object has changed from the last frame as the image quality priority image.

In addition, the determination section 26 may determine the frame image immediately after the assets used for drawing the frame image are switched as the image quality priority image.

In addition, the determination section 26 need not determine whether or not a scene change from the last frame has occurred on the basis of the image quality priority necessity data. For example, the determination section 26 may determine whether or not a scene change from the last frame has occurred on the basis of the result of comparison between the frame image and a frame image of the frame immediately before the frame image.

For example, in a case where a value indicating the amount of change of a scene is larger than a predetermined value, the determination section 26 may determine that a scene change from the last frame has occurred, otherwise the determination section 26 may determine that a scene change from the last frame has not occurred.

Here, as the value indicating the amount of change of the scene, for example, an index value indicating the degree of difference or similarity between the last frame image and the frame image may be used. For example, in a case where the PSNR (Peak Signal to Noise Ratio) or the SSIM (Structural Similarity) is smaller than a predetermined value, it may be determined that a scene change has not occurred, otherwise it may be determined that a scene change has occurred. Moreover, an ME (Motion Estimation) change amount may be used as the amount of change of the scene. For example, in a case where the value of the ME change amount is larger than a predetermined value, it may be determined that a scene change has occurred, otherwise it may be determined that a scene change has not occurred. Moreover, as the value indicating the amount of change of the scene, a value indicating the degree of discontinuity of audio between the timing at which the last frame image is displayed and the timing at which the frame image of the frame is displayed may be used. For example, in a case where the value is larger than a predetermined value, it may be determined that a scene change has occurred, otherwise it may be determined that a scene change has not occurred.

In addition, it may be determined whether or not a scene change from the last frame has occurred on the basis of the amount of change of a score value indicating the content represented by the frame image derived on the basis of a predetermined rule. For example, it may be determined whether or not a scene change has occurred on the basis of the amount of change of the score value calculated from information such as whether or not it is the scene switching timing, the type of image texture represented in the frame, the distribution of feature points, depth information, the amount of objects, the amount of use of mipmap texture used for three-dimensional graphics in each level, LOD (Level Of Detail), the amount of use of tessellation in each level, the amount of characters and symbols, and the type of scene represented. Here, for example, score values representing the priorities of the spatial degree of detail and the temporal degree of detail may be calculated.

In the embodiment, for example, the basic parameter value decision section 28a decides, for the frame image that is not the image quality priority image, the values of the parameters used for encoding an encoding unit that is a part or whole of the frame image.

In the embodiment, for example, the image quality priority parameter value decision section 28b decides, for the frame image that is the image quality priority image, the values of the parameters used for encoding an encoding unit that is a part or whole of the frame image.

As described above, for example, the values of the parameters such as the QP, the bit depth, and the image resolution are decided. It should be noted that the values of the parameters may include a value indicating the frame type (for example, whether the frame is an I frame or a P frame) of the generated image data.

In addition, the basic parameter value decision section 28a may decide the values of the parameters by applying the difference between the control amount and the target value to a predetermined control rule.

In addition, the image quality priority parameter value decision section 28b may decide, as the values of the parameters used for the encoding unit of the frame image, values by which the data size of the generated image data becomes larger than those decided by applying the difference between the control amount and the target value to the above-described predetermined control rule. For example, the image quality priority parameter value decision section 28b may decide, as the values of the parameters used for the encoding unit of the frame image, values at which the compression ratio of the generated image data becomes smaller than those decided by applying the difference between the control amount and the target value to the above-described predetermined control rule. Then, the values of the parameters corresponding to the decided compression ratio may be decided.

In addition, the image quality priority parameter value decision section 28b may decide the values of the parameters that correspond to a case where a value smaller than the difference between the control amount and the target value is applied to the above-described predetermined control rule and are used for the encoding unit of the frame image.

In the embodiment, for the frame image next to the image quality priority image, the basic parameter value decision section 28a may decide the values of the parameters used for the encoding unit of the frame image by applying the difference between the control amount and the target value to the above-described predetermined control rule. In this case, the control amount changed depending on the image quality priority image is taken over to the decision of the parameter values related to the frame image next to the image quality priority image. Since a state in which the data size of the image data and the length of the latency are overshot is taken over, processing for converging the overshoot is executed in the decision of the parameter values related to the frame image next to the image quality priority image.

In addition, for the frame image next to the image quality priority image, the basic parameter value decision section 28a may decide values at which the data size of the generated image data becomes smaller than those decided by applying the difference between the control amount and the target value to the above-described predetermined control rule. For example, for the frame image next to the image quality priority image, values at which the compression ratio of the generated image data becomes larger than those decided by applying the difference between the control amount and the target value to the above-described predetermined control rule may be decided. Then, the values of the parameters corresponding to the decided compression ratio may be decided.

In addition, at least one of the basic parameter value decision section 28a and the image quality priority parameter value decision section 28b may decide the values of the parameters on the basis of, for example, the current transferable bandwidth of the computer network 14. For example, as the value indicating the transferable bandwidth becomes larger, a lower compression ratio may be decided. In a case where there is a margin in the transferable bandwidth, it is conceivable that a lower compression ratio does not cause a serious problem. In addition, since skipping of the encoding of the frame image after the frame can be omitted if the transferable bandwidth is sufficient, a lower compression ratio does not cause a serious problem, also from this point of view, in a case where the transferable bandwidth is sufficient.

In addition, at least one of the basic parameter value decision section 28a and the image quality priority parameter value decision section 28b may further decide the values of the parameters on the basis of at least one of the number of times the image data has been missing per unit time in the past and the number of times the I frame has been generated per unit time in the past. For example, as the number of times the image data has been missing per unit time is larger for the most recent predetermined time, a higher compression ratio may be decided. In addition, as the number of times the I frame has been generated per unit time is larger for the most recent predetermined time, a higher compression ratio may be decided.

When the number of I frame transfers increases in a situation where the transfer bandwidth is insufficient, the frame rate becomes discontinuous due to either unintended data missing due to an excessive transfer amount or intentional skipping of transmission of the image data after the I frame. As a result, smoothness in the reproduction of a moving image in the terminal 12 is lowered, and the user experience is deteriorated. In such a case, even if the amount of change of the scene is large, priority may be given to ensuring the smoothness of the frame rate by increasing the compression ratio.

In addition, at least one of the basic parameter value decision section 28a and the image quality priority parameter value decision section 28b may decide the values of the parameters by using a machine learning model such as deep learning.

In addition, at least one of the basic parameter value decision section 28a and the image quality priority parameter value decision section 28b may decide the values of the parameters on the basis of a comprehensive evaluation value obtained by combining some or all of the foregoing.

The above-described control amount is not limited to the cumulative data size. For example, the control amount may be the data size of the image data generated per unit time. In addition, the above-described length of the latency may be the control amount. Here, the length of the latency means, for example, the length of time from the start timing of the encoding of a frame image to the transmission end timing of the image data generated on the basis of the frame image as described above.

In addition, in the rate control according to the embodiment, feedback control that is PID control may be executed. In this case, the image quality priority parameter value decision section 28b may decide the values of the parameters used for the encoding unit of the frame image by suppressing the gain of at least one of proportional control and differential control in the PID control more than that decided by the basic parameter value decision section 28a.

In addition, the image quality priority parameter value decision section 28b may decide the values of the parameters on the basis of the difference between the control amount and the target value at a time interval longer than that of the basic parameter value decision section 28a. For example, the image quality priority parameter value decision section 28b may decide the values of the parameters on the basis of the difference between the control amount and the target value for each frame image, and the basic parameter value decision section 28a may decide the values of the parameters on the basis of the difference between the control amount and the target value for each slice. As described above, by roughening the time granularity of the feedback control in the decision of the values of the parameters by the image quality priority parameter value decision section 28b, it is possible to create a state in which an overshoot occurs on purpose.

In the embodiment, for example, the encoding processing section 30 generates image data by executing the encoding of the above-described encoding unit on the basis of the values of the parameters decided by the basic parameter value decision section 28a or the image quality priority parameter value decision section 28b.

In addition, the encoding processing section 30 may skip the encoding of the frame image next to the image quality priority image.

Here, the encoding processing section 30 may decide the number of frame skips on the basis of the data size of the image data generated by encoding the image quality priority image. For example, as the data size is larger, a larger number of frame skips may be decided. Then, the encoding of the frame image following the image quality priority image may be skipped by the decided number of frame skips.

In the embodiment, the control (frame drop control) related to the skipping of the encoding may be performed by the rate control. For example, for the image quality priority image, the values of the parameters may be decided so as to permit a large overshoot, and the data size of the image data may be larger than usual. Then, on the basis of this, the overshoot may be converged by deciding the number of frame skips in the rate control.

In addition, the encoding processing section 30 may generate image data in accordance with a value that is decided by the basic parameter value decision section 28a or the image quality priority parameter value decision section 28b and that indicates the frame type of the generated image data. For example, in a case where the value indicating the frame type is a value corresponding to an I frame, the I frame may be generated, and in a case where the value indicating the frame type is a value corresponding to a P frame, the P frame may be generated.

In addition, the encoding processing section 30 may encode the frame image as the image quality priority image into the I frame. For example, the frame image as the image quality priority image may be always or preferentially encoded into the I frame. The encoding processing section 30 may, for example, encode the frame image determined as the image quality priority image by the determination section 26 into the I frame.

In addition, the encoding processing section 30 may execute encoding using a GDR technique for the frame image that is not the image quality priority image.

In the embodiment, for example, the transmission section 32 transmits the image data generated by the encoding processing section 30 to the terminal 12. Here, the transmission section 32 may specify the transferable bandwidth by monitoring the communication status of the computer network 14. Then, the transmission section 32 may transmit the image data to the terminal 12 at a data rate according to the specified transferable bandwidth.

In addition, in the embodiment, the image generation section 22 may generate the frame image on the basis of drawing intermediate data (for example, arrangement information of data of a three-dimensional model representing a virtual space in the virtual space) representing a state of viewing the virtual space from a virtual object arranged in the virtual space.

Then, the image quality priority necessity data generation section 22a may associate the frame image generated by the image generation section 22 on the basis of the drawing intermediate data immediately after the virtual object, which is the subject of viewing the virtual space, has changed from the last frame with the image quality priority necessity data capable of specifying that the frame image is the image quality priority image.

Then, the determination section 26 may determine that the frame image generated by the image generation section 22 is the image quality priority image on the basis of the drawing intermediate data immediately after the virtual object, which is the subject of viewing the virtual space, has changed from the last frame. For example, the determination section 26 may determine that the frame image associated with the image quality priority necessity data whose value is 1 on the basis of the above-described drawing intermediate data by the image quality priority necessity data generation section 22a is the image quality priority image.

In addition, the image quality priority necessity data generation section 22a need not determine whether or not the virtual object, which is the subject of viewing the virtual space, has changed from the last frame on the basis of the drawing intermediate data. Then, in this case, the determination section 26 may determine whether or not the frame image generated on the basis of the drawing intermediate data is the image quality priority image on the basis of the drawing intermediate data representing a state of viewing the virtual space from the virtual object arranged in the virtual space. For example, the determination section 26 may determine whether or not the virtual object, which is the subject of viewing the virtual space, has changed from the last frame on the basis of the drawing intermediate data. Then, the frame image of the frame in which the virtual object, which is the subject of viewing the virtual space, is determined to have changed from the last frame may be determined as the image quality priority image.

In the embodiment, for example, the reception section 40 receives image data from the transmission device.

In the embodiment, for example, the reception buffer 42 stores the image data received by the reception section 40.

In the embodiment, for example, the decoding processing section 44 generates a play image by decoding the image data stored in the reception buffer 42.

In the embodiment, for example, the display control section 46 displays the play image generated by the decoding processing section 44.

Figure 8:
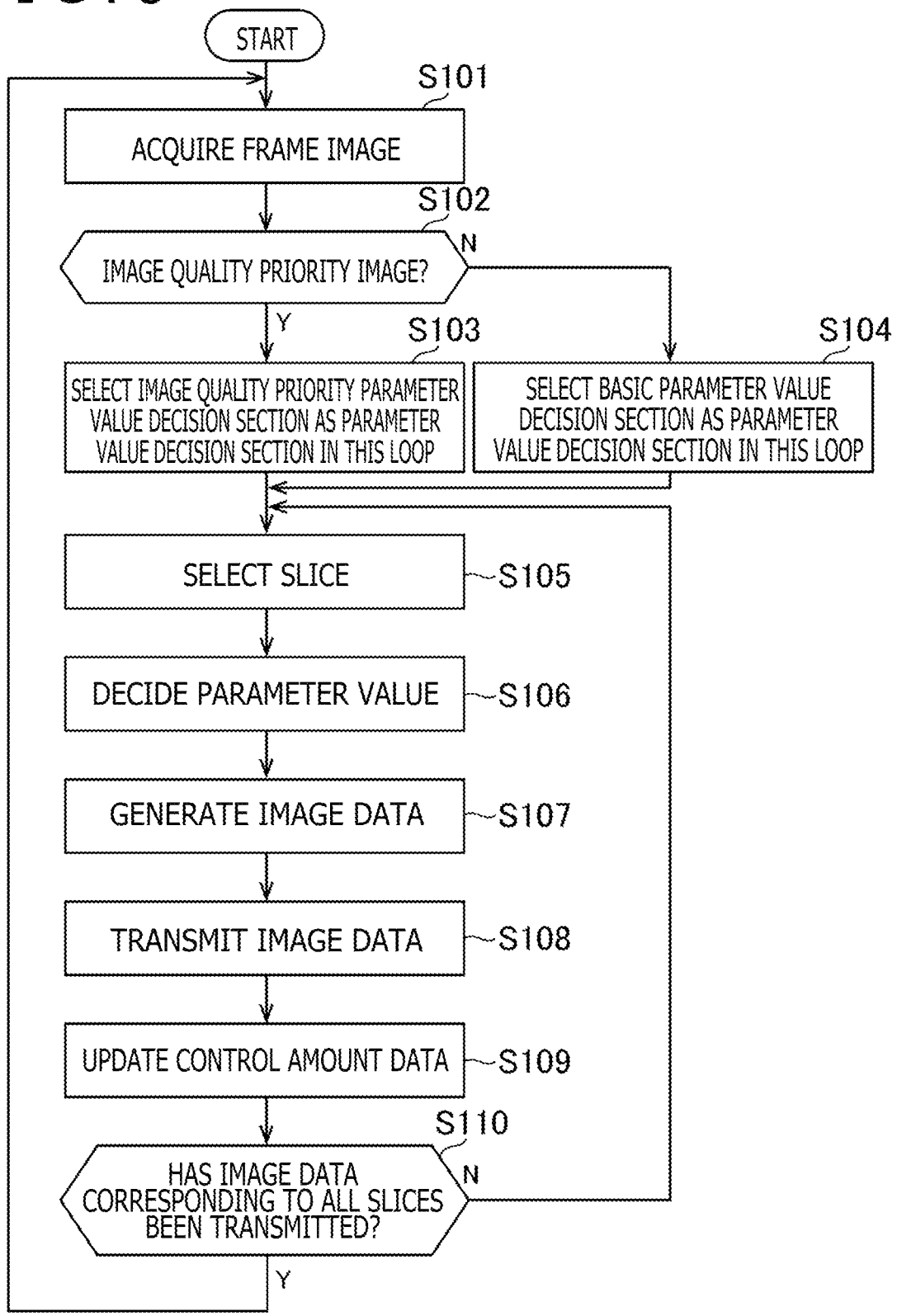
FIG. 8 is a flow diagram for illustrating an example of a flow of processing performed in a cloud server according to the embodiment of the present invention.

Here, an example of a flow of processing executed in the cloud server 10 according to the embodiment will be described with reference to a flow diagram exemplified in FIG. 8. The processing illustrated in S101 to S110 of FIG. 8 is repeatedly executed. The processing illustrated in S101 to S110 of FIG. 8 is basically repeated at a fixed or variable frame rate. It should be noted that, in the processing example, it is assumed that the comparison section 20 updates target value data stored in the comparison section 20 at predetermined time intervals.

First, the acquisition section 24 acquires a frame image of the frame drawn in the frame buffer (S101).

Then, the determination section 26 determines whether or not the frame image acquired in the processing illustrated in S101 is the image quality priority image (S102).

If it is determined to be the image quality priority image in the processing illustrated in S102 (S102: Y), the determination section 26 selects the image quality priority parameter value decision section 28b as a parameter value decision section in the loop (S103).

If it is determined not to be the image quality priority image in the processing illustrated in S102 (S102: N), the determination section 26 selects the basic parameter value decision section 28a as a parameter value decision section in the loop (S104).

Then, the encoding processing section 30 selects one of a plurality of slices included in the frame image acquired in the processing illustrated in S101, for which the processing illustrated in S106 to S109 has not been executed (S105).

Then, the parameter value decision section in the loop selected in the processing illustrated in S103 or S104 decides the values of the parameters used for the encoding processing of the slice selected in the processing illustrated in S105 (S106). For example, the values of the parameters are decided on the basis of the difference between the control amount and the target value and the feature (for example, the magnitude of movement from the last frame or the like) of the frame image acquired in the processing illustrated in S101.

Here, for example, the difference between the control amount and the target value may be specified on the basis of the control amount data and the target value data stored in the comparison section 20.

In addition, the compression ratio may be decided in the processing illustrated in S106. Then, the values of various parameters may be decided on the basis of the decided compression ratio.

Then, the encoding processing section 30 encodes the slice selected in the processing illustrated in S105 on the basis of the values of the parameters decided in the processing illustrated in S106, so that image data corresponding to the slice is generated (S107).

Then, the transmission section 32 transmits the image data generated in the processing illustrated in S107 to the terminal 12 (S108).

Then, the comparison section 20 updates the control amount data stored in the comparison section 20 (S109). Here, for example, the comparison section 20 increases the value of the control amount data by the value indicating the data size of the image data generated in the processing illustrated in S107.

Then, the transmission section 32 confirms whether or not the image data corresponding to all the slices included in the frame image acquired in the processing illustrated in S101 has been transmitted (S110).

In a case where the image data corresponding to all the slices has not been transmitted (S110: N), the flow returns to the processing illustrated in S105.

In a case where the image data corresponding to all the slices has been transmitted (S110: Y), the flow returns to the processing illustrated in S101.

In the processing example described above, in a case where it is determined not to be the image quality priority image in the processing illustrated in S102, feedback control may be executed for each frame image instead of feedback control for each slice illustrated in S105 to S109.

In this case, for example, the basic parameter value decision section 28a may decide the values of the parameters used for the encoding processing of the frame image acquired in the processing illustrated in S101.

Then, the encoding processing section 30 may generate image data by encoding the frame image acquired in the processing illustrated in S101 on the basis of the decided values of the parameters.

Then, the transmission section 32 may transmit the generated image data to the terminal 12.

Then, the comparison section 20 updates the control amount data stored in the comparison section 20, and the flow may return to the processing illustrated in S101.

It should be noted that the present invention is not limited to the above-described embodiment.

In addition, the scope of application of the present invention is not limited to the cloud gaming system 1. For example, the present invention is also applicable to a game system including a server arranged in a home and a terminal connected to the server via a home network, a public network, a carrier network of a cellular phone, or the like. That is, the computer network 14 may be a home network, a public network, a carrier network of a cellular phone, or the like. In addition, the server and the terminal may be connected to each other in a wired or wireless manner.

In addition, the contents of the game to which the present invention is applied are not particularly limited, and the present invention is also applicable to a game system for executing a game using, for example, VR (Virtual Reality) or AR (Augmented Reality).

In addition, the scope of application of the present invention is not limited to a game, and the present invention is generally applicable to a scene in which a moving image is transmitted from a transmission device corresponding to the above-described cloud server 10.

In addition, the specific character strings and numerical values described above and the specific character strings and numerical values in the drawings are examples, and the present invention is not limited to these character strings and numerical values.

The invention claimed is:

1. A transmission device comprising:
   an acquisition section that sequentially acquires frame images drawn in a frame buffer;
   a determination section that determines whether or not the frame image is an image quality priority image;
   a basic parameter value decision section that decides, for the frame image that is not the image quality priority image, values of parameters used for encoding an encoding unit that is a part or whole of the frame image, by applying a difference between a control amount and a target value to a predetermined control rule;
   an image quality priority parameter value decision section that decides, for the frame image that is the image quality priority image, values of parameters used for the encoding unit of the frame image;
   an encoding processing section that generates image data by executing the encoding of the encoding unit on a basis of the values of the parameters decided by the basic parameter value decision section or the image quality priority parameter value decision section; and
   a transmission section that transmits the image data,
   wherein the image quality priority parameter value decision section decides, as the values of the parameters used for the encoding unit of the frame image, values by which a data size of the generated image data becomes larger than those decided by applying the difference between the control amount and the target value to the predetermined control rule, and
   wherein the determination section determines that the frame image immediately after assets used for drawing the frame image are switched is the image quality priority image.

2. The transmission device according to claim 1, wherein the encoding processing section skips encoding of the frame image next to the image quality priority image.

3. The transmission device according to claim 1, wherein
   the encoding processing section decides the number of frame skips on a basis of the data size of the image data generated by encoding the image quality priority image, and
   the encoding processing section skips encoding of the frame image following the image quality priority image by the number of frame skips.

4. The transmission device according to claim 1, wherein, for the frame image next to the image quality priority image, the basic parameter value decision section decides the values of the parameters used for the encoding unit of the frame image by applying the difference between the control amount and the target value to the predetermined control rule.

5. The transmission device according to claim 1, wherein, for the frame image next to the image quality priority image, the basic parameter value decision section decides, as the values of the parameters, values by which the data size of the generated image data becomes smaller than those decided by applying the difference between the control amount and the target value to the predetermined control rule.

6. The transmission device according to claim 1, wherein
   the acquisition section acquires the frame image associated with image quality priority necessity data capable of specifying whether or not the frame image is the image quality priority image, and
   the determination section determines whether or not the frame image is the image quality priority image on a basis of the image quality priority necessity data associated with the frame image.

7. The transmission device according to claim 6, further comprising:
   an image quality priority necessity data generation section that generates the image quality priority necessity data and associates the image quality priority necessity data with the frame image.

8. The transmission device according to claim 7, wherein the image quality priority necessity data generation section associates a frame image immediately after a camera cut is performed after description of a continuous scene or a continuous game play is terminated with the image quality priority necessity data capable of specifying that the frame image is the image quality priority image.

9. The transmission device according to claim 7, wherein the image quality priority necessity data generation section associates a frame image immediately after a stage in a game has changed with the image quality priority necessity data capable of specifying that the frame image is the image quality priority image.

10. The transmission device according to claim 7, wherein the image quality priority necessity data generation section associates a frame image immediately after assets used for drawing the frame image are switched after the drawing of a continuous scene is terminated with the image quality priority necessity data capable of specifying that the frame image is the image quality priority image.

11. The transmission device according to claim 7, wherein the image quality priority necessity data generation section associates a frame image immediately after a new asset used for drawing the frame image is loaded into a memory with the image quality priority necessity data capable of specifying that the frame image is the image quality priority image.

12. The transmission device according to claim 1, wherein the determination section determines that the frame image in which a scene change from a last frame has occurred is the image quality priority image.

13. The transmission device according to claim 1, wherein the acquisition section acquires the frame image representing a state of viewing a virtual space from a virtual object arranged in the virtual space, and the determination section determines that the frame image immediately after the virtual object has changed from a last frame is the image quality priority image.

14. The transmission device according to claim 1, further comprising:
   an image generating section that generates the frame image on a basis of drawing intermediate data representing a state of viewing a virtual space from a virtual object arranged in the virtual space,
   wherein the determination section determines that the frame image generated by the image generation section on the basis of the drawing intermediate data immediately after the virtual object has changed from a last frame is the image quality priority image.

15. The transmission device according to claim 1, wherein the determination section determines whether or not the frame image is the image quality priority image, on a basis of a result of comparison between the frame image and a frame image of a frame immediately before the frame image.

16. The transmission device according to claim 1, wherein the encoding processing section encodes the frame image as the image quality priority image into an I frame.

17. The transmission device according to claim 1, wherein the image quality priority parameter value decision section decides, as the values of the parameters used for the encoding unit of the frame image, values by which a compression ratio of the generated image data becomes smaller than those decided by applying the difference between the control amount and the target value to the predetermined control rule.

18. The transmission device according to claim 1, wherein the encoding processing section executes encoding using a gradual decoder refresh technique for the frame image that is not the image quality priority image.

19. The transmission device according to claim 1, wherein the control amount is the data size of the image data or a length of time from a start timing of the encoding of the frame image to a transmission end timing of the image data generated on a basis of the frame image.

20. The transmission device according to claim 1, wherein the image quality priority parameter value decision section decides the values of the parameters that correspond to a case where a value smaller than the difference between the control amount and the target value is applied to the predetermined control rule and are used for the encoding unit of the frame image.

21. The transmission device according to claim 1, wherein the basic parameter value decision section and the image quality priority parameter value decision section decide the values of the parameters used for the encoding unit by performing proportional integral derivative control, and
   the image quality priority parameter value decision section decides the values of the parameters used for the encoding unit of the frame image by suppressing a gain of at least one of proportional control and differential control in the proportional integral derivative control more than that decided by the basic parameter value decision section.

22. The transmission device according to claim 1, wherein the image quality priority parameter value decision section decides the values of the parameters on a basis of the difference between the control amount and the target value at a time interval longer than that of the basic parameter value decision section.

23. The transmission device according to claim 1, wherein the basic parameter value decision section or the image quality priority parameter value decision section decides the values of the parameters further on a basis of at least one of the number of times the image data has been missing per unit time in the past and the number of times the I frame has been generated per unit time in the past.

24. A transmission method comprising:
   a sequentially acquiring frame images drawn in a frame buffer;
   a determining whether or not the frame image is an image quality priority image;
   a basic parameter value decision step of deciding, for the frame image that is not the image quality priority image, values of parameters used for encoding an encoding unit that is a part or whole of the frame image, by applying a difference between a control amount and a target value to a predetermined control rule;
   an image quality priority parameter value decision step of deciding, for the frame image that is the image quality priority image, values of parameters used for the encoding unit of the frame image;
   an encoding processing step of generating image data by executing the encoding of the encoding unit on a basis of the values of the parameters decided in the basic parameter value decision step or the image quality priority parameter value decision step; and
   a transmitting the image data, wherein, in the image quality priority parameter value decision step, as the values of the parameters used for the encoding unit of the frame image, values by which a data size of the generated image data becomes larger than those decided by applying the difference between the control amount and the target value to the predetermined control rule are decided,
   wherein the determining includes determining that the frame image immediately after assets used for drawing the frame image are switched is the image quality priority image.

25. A non-transitory computer storage readable medium comprising computer executable program code configured to instruct a computer to perform the following steps:
   by an acquisition section, sequentially acquiring frame images drawn in a frame buffer;
   by a determination section, determining whether or not the frame image is an image quality priority image;
   a basic parameter value decision procedure of deciding, for the frame image that is not the image quality priority image, values of parameters used for encoding an encoding unit that is a part or whole of the frame image, by applying a difference between a control amount and a target value to a predetermined control rule;
   an image quality priority parameter value decision procedure of deciding, for the frame image that is the image quality priority image, values of parameters used for the encoding unit of the frame image;
   an encoding processing procedure of generating image data by executing the encoding of the encoding unit on a basis of the values of the parameters decided in the basic parameter value decision procedure or the image quality priority parameter value decision procedure; and by a transmission section, transmitting the image data, wherein, in the image quality priority parameter value decision procedure, as the values of the parameters used for the encoding unit of the frame image, values by which a data size of the generated image data becomes larger than those decided by applying the difference between the control amount and the target value to the predetermined control rule are decided, and wherein the determination section determines that the frame image immediately after assets used for drawing the frame image are switched is the image quality priority image.

* * * * *